United States Patent [19]

Hendrickson et al.

[11] E Re. 29,661

[45] Reissued June 6, 1978

[54] SULFURIZED METAL PHENATES

[75] Inventors: Yngve Gust Hendrickson, El Cerrito; John M. King, San Rafael, both of Calif.

[73] Assignee: Chevron Research Company, San Francisco, Calif.

[21] Appl. No.: 812,940

[22] Filed: Jul. 5, 1977

Related U.S. Patent Documents

Reissue of:

[64] Patent No.: 3,801,507
Issued: Apr. 2, 1974
Appl. No.: 281,863
Filed: Aug. 18, 1972

[51] Int. Cl.[2] ..... C10M 1/54

[52] U.S. Cl. ..... 252/42.7; 252/18; 260/137; 260/609 F

[58] Field of Search ..... 252/18, 42.7; 260/137, 260/609 F

[56] References Cited

U.S. PATENT DOCUMENTS 2,680,096 6/1954 Walker et al. ..... 252/42.7

FOREIGN PATENT DOCUMENTS 1,055,006 4/1953 Germany ..... 252/42.7

*Primary Examiner*—Delbert E. Gantz
*Assistant Examiner*—Andrew H. Metz
*Attorney, Agent, or Firm*—C. J. Tonkin; J. J. De Young

[57] ABSTRACT

A novel multifunctional lube oil additive is provided and comprising the reaction product of an alkyl phenol having from 8 to 35 carbons in the alkyl group, sulfur and an alkaline earth metal oxide or hydroxide. The reaction is performed in a two step process in the presence of a mutual solvent whereby the sulfurized metal phenate produced has a sulfur to metal atom ratio between about 1 and 2 *and an alkalinity value of 40 to 200 mg. KOH/gram.*

13 Claims, No Drawings

SULFURIZED METAL PHENATES

Matter enclosed in heavy brackets [ ] appears in the original patent but forms no part of this reissue specification; matter printed in italics indicates the additions made by reissue.

BACKGROUND OF THE INVENTION

Field of the Invention

Lubricating oils used under the severe conditions of diesel and gasoline engines are highly compounded so as to neutralize acids derived from the oxidation of sulfur in the fuel and from partial oxidation of hydrocarbons, both from the fuel and oil; to disperse sludge- and varnish-forming precursors within the oil; and to inhibit oxidation and wear; as well as enhancing other lubrication properties of the oil. In addition to the requirements normally attendant to a diesel and gasoline lubricating oil, those oils which find use in railway diesel engines have the additional factor of not being corrosive or reactive to silver. Silver bearings are used in a preponderant number of diesel railway engines today.

The desirability of having a single additive providing multifunctional properties is evident in the efficiency and economies in the manufacturing and using of a single additive as compared to a plurality of additives. However, because of the severe operating conditions under which a lubricating oil performs in diesel and gasoline engines, it is frequently found that additives, while effectively performing a particular function, will tend to degrade and enhance deposit formation. Therefore, in designing any particular additive, it is essential not only that it fulfill the functions for which it has been designed, but that it be stable under the conditions of use or degrade slowly to materials which do not enhance deposit formation.

Description of the Prior Art

Sulfurized alkaline earth metal phenoxides and phenates have been employed in lubricants for a long time. One particularly successful sulfurized metal phenate is disclosed in U.S. Pat. No. 2,680,096 as normal and basic sulfurized calcium phenate. These compounds are prepared by contacting an alkyl phenol, calcium hydroxide and sulfur within a suitable reaction vessel in the presence of ethylene glycol. The resulting reaction product has a sulfur to calcium weight ratio generally between about 0.3 and 0.7. Although these compounds work well as lubricating oil dispersants antioxidants and agents for neutralizing corrosive acids, the recent advances toward diesel and gasoline engines operating under more severe conditions have created a greater demand for sulfurized metal phenates having improved properties.

Other investigators in the sulfurized metal phenate field have formulated numerous types of such compounds, but as before, each of the resulting sulfurized metal phenates has a sulfur to calcium weight ratio below about 1. Typical investigations are disclosed in U.S. Pat. Nos. 2,415,833; 2,680,097; 2,916,454; 2,989,466; 3,178,368; 3,367,867 and others.

While these investigations have revealed many new and useful sulfurized metal phenates, there is still a need for a lube oil additive having better dispersancy and improved antioxidant activity than is heretofore available without adversely affecting exposed silver parts and particularly bearings. It is also important that such additives be relatively inexpensive to make.

It is therefore an object of this invention to provide a sulfurized metal phenate having improved antioxidant and dispersancy properties and lubricants containing the same. It is another object of this invention to provide an improved lubricating oil for use in diesel engines and including diesel engines employing silver bearings.

It is an additional object of this invention to provide a method of making novel sulfurized metal phenates and lubricant containing the same.

Additional objects will become apparent from the following description of the invention and the appended claims.

SUMMARY

The foregoing objects and their attendant advantages can be realized by a mixture of sulfurized alkaline earth metal phenates prepared by reacting an alkaline earth metal base with a sulfurized alkyl phenol and having an average sulfur-to-metal atom ratio between about 1 and 4. The compounds are prepared by a two step reaction procedure in which 1.0 to 5 mols of sulfur, and from 0.05 to 1.5 moles preferably 0.2 to 1.0 mol of alkaline earth metal base are contacted in a first step with each mol of an alkyl phenol having from 8 to 35 carbons in the alkyl group. The contacting is conducted in the presence of 0.1 to 4 mols and preferably from 0.2 to 1 mol of a mutual solvent having solvency for the alkyl phenol and alkaline earth metal base per mol of alkyl phenol.

In a second step, the sulfurized reaction product above is contacted with 0 to 1.45 mols of additional alkaline earth metal base and 0.5 to 4 mols of mutual solvent per mol of original alkyl phenol under conditions conducive to the formation of the sulfurized alkaline earth metal phenate product.

The exact mechanism of the sulfurized metal phenates in exhibiting the multifunctional properties and particularly good silver lubrication, is unknown. Although these mechanisms are unknown, it is known, on the other hand, that these compounds exhibit excellent antioxidant properties and possess high base reserve when incorporated into lubricating oils.

DETAILED DESCRIPTION OF THE INVENTION

The sulfurized metal phenate mixture of this invention is prepared by a two step processing scheme. Some advantages of the two-step process over a single step method include reduced undesired side reactions of the sulfur reactant with the mutual solvent and an improved base reserve.

First processing step

In a first step an alkylated phenol having from 8 to 35 carbons in the alkyl group is contacted with sulfur and a small amount of an alkaline earth metal oxide or hydroxide and a mutual solvent, preferably ethylene glycol. The reaction of the alkyl phenol, metal base and sulfur proceeds substantially as shown in the following chemical equation:

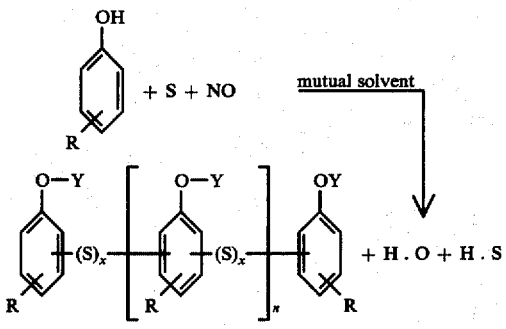

wherein

R is an alkyl group having from 8 to 35 carbons;

x is an integer from 1 to 5, n is an integer from 0 to 15,

Y is the same or different constituent selected from H or ½M where the ratio of H to ½M is proportional to the ratio of M to alkyl phenol reacted; and M is an alkaline earth metal.

The above equation represents a broad and simplified version of both the reaction between the alkyl phenol, sulfur and metal base and the sulfurized intermediate reaction product. The intermediate is not a pure compound having only one single structure, but, rather, is a mixture of numerous sulfurized compounds where n and x have several values. The above formula indicates that a metal atom is bonded to or associated with at least one phenolic group in each molecule of the intermediate. However, because the composition is a mixture of compounds, it is recognized that some molecules of sulfurized alkyl phenol may not be bonded to or associated with a metal atom. Inversely, other molecules may have all of the phenolic groups neutralized by the metal base. The metal atoms may be bonded to the phenolic group through a covalent bond or ionized and exist as cations within the intermediate product mixture. Thus, it is apparent that while the above chemical equation represents a general description of the reaction and the intermediate reaction product, it should not be interpreted as limiting the invention to the exact structure as shown.

The above processing step may be performed by either continuous or batch processing method, however, for purposes of illustration, the following discussion is related to the preferred batch processing. Modifications to continuous processing is within the skill of the art, and, in order to be concise, an independent discussion of continuous processing is not presented.

The three reactants are preferably charged to a suitable reaction vessel and agitated prior to the addition of the mutual solvent. When the mutual solvent is introduced into the vessel the exothermic reaction occurs with a strong evolution of hydrogen sulfide gas and water vapor. Thus, a means for handling the large volumes of gaseous effluents must be provided. The reaction can be conducted at a temperature from 250 to 450° F. and a pressure of from 5 to 20 p.s.i.a. Preferred reaction conditions include temperatures from 275 to 400° F. and pressures from 10 to 15 p.s.i.a. The reaction proceeds at a moderate rate at the reaction conditions and usually varies from 1 to 6 hours.

A reaction diluent is preferably provided so as to allow easy handling of the reaction products during the processing steps. The diluent may be added to the system before, during or after the reaction although it is preferred to add the diluent whenever necessary to reduce the viscosity of the mixtures to a desired value.

The concentration of alkyl phenol, alkaline earth metal base, sulfur and mutual solvent within the inert reaction diluent during the reaction is not important and may vary with the selection of reactants and process conditions, etc.

Generally, however, the concentration of the various components within the inert reaction medium varies as shown in the following Table 1.

TABLE 1

| Component | Component concentration (mol percent[1]) Broad range | Preferred range |
|---|---|---|
| Alkyl phenol | 8.7–47 | 16–35 |
| Alkaline earth metal base | 0.5–42 | 8.8–27 |
| Sulfur | 13–81 | 33–68 |
| Mutual solvent | 1.3–66 | 3.8–27 |
| Reaction diluent (wt. percent) | 0–75 | 0–50 |

[1]Excluding the reaction diluent.

The molar ratio of the various components is an important aspect in the practice of the claimed invention and must be followed in order to realize the critical sulfur:metal ratio in the final sulfurized phenate product. The ratios should be maintained as follows: 1 to 5 mols and preferably 1.5 to 3 mols of sulfur, 0.03 to 1.5 mols and preferably from 0.2 to 1 mol of alkaline earth metal base and 0.1 to 4 mols and preferably 0.2 to 1 mol of mutual solvent per mol of alkyl phenol.

Excellent results can be realized when 2 mols of sulfur 0.3 mol of alkaline earth metal base and 0.2 mol of mutual solvent per mol of alkyl phenol are employed within the reaction medium.

In a preferred first step processing scheme, the sulfur, alkyl phenol and alkaline earth metal base are charged to a reaction vessel equipped with a vent line and vacuum pump. The reactor contents are heated to 250–285° F. under atmospheric pressure and the mutual solvent is charged to the reaction over a 16–30 minute period. During this time, hydrogen sulfide and water are evolved and are removed from the system through the vent line. The reaction is maintained at 265–285° F. for a period of 1 to 2 hours and then heated to a temperature of 350–365° F. for an additional 3 to 5 hours. At the end of the period, the reactor contents are cooled and a reaction diluent is charged to the reactor.

The sulfurized intermediate at this point contains some elemental or polysulfide sulfur (generally 2 to 10 weight percent) and is ready for use in the second processing step, although it is recognized that it may be filtered to remove any particulate matter or subjected to other purification steps or stored for later use.

Second processing step

In the second processing step, the sulfurized intermediate is contacted with an additional amount of alkaline earth metal base and mutual solvent. This step, like the first step, may be performed by batch or continuous processing means. For purposes of illustration, the following discussion relates to preferred batch processing. The sulfurized intermediate is charged to the reactor along with the reaction solvent, usually a diluent oil, and alkaline earth metal base. The three components are vigorously agitated to disperse the metal base throughout the mixture. The mutual solvent is thereafter introduced into the admixture and catalyzes the exothermic reaction. Upon contacting the reaction medium, hydrogen sulfide and water vapor begin to evolve and are immediately taken off overhead. The delayed removal of the hydrogen sulfide and water vapor encourages the oxidation of some of the mutual solvents, such as ethylene glycol to glycolic acid, oxalic acid, etc., which in turn react with the metal base and reduce the base reserve of the product.

The reaction conditions which can be employed in this step can comprise temperatures between about 250 and 450° F. and preferably between 275 and 400° F. and pressures between 2 and 15 p.s.i.a. and preferably between 2 and 10 p.s.i.a. The time required to neutralize the sulfurized intermediate with the metal base varies depending upon the reactants and mutual solvent selected, the concentrations employed, reaction conditions, etc. Generally, however, the reaction is completed after approximately 4 to 10 hours. At the end of the reaction or concurrent with it, the mutual solvent is preferably stripped from the product.

The concentration of the sulfurized intermediate, alkaline earth metal base and mutual solvent within the reaction medium is not critical to the practice of this invention except that sufficient diluent is preferably employed to accommodate mixing and pumping of the product. The ratio of components, on the other hand, is important and should be within the following ranges: from 0 to 1.45 mols and preferably from 0.2 to 0.6 mol of alkaline earth metal base and from 0.5 to 4 mols and preferably from 0.5 to 2 mols of total mutual solvent present per mol of original alkyl phenol employed. The following Table 2 illustrates the ratios of components employed:

TABLE 2

| Component | Component concentration (mol percent[1]) Broad range | Preferred value |
|---|---|---|
| Alkyl phenol (from SI[2]) | 5–67 | 28–67 |
| Alkaline earth metal base added | 0–19 | 6–29 |
| Mutual solvent | 17–80 | 21–63 |
| Reaction diluent (wt. percent) | 0–75 | 1–50 |

[1]Excluding reaction diluent.
[2]SI represents sulfurized intermediate.

The final product has a metal content which ranges from 0.5 to 15 weight percent and a sulfur content from 3.5 to 10 weight percent. The sulfur:metal molar ratio varies from 1 to 4 and preferably from 1.1 to 4 and more preferably from 1.1 to 2. The alkalinity value (ASTM Test D-2896) of the sulfurized metal phenate ranges from 40 to 200 mg. KOH/gram and more usually from 90 to 150 mg.KOH/gram.

REACTANTS MUTUAL SOLVENT AND REACTION DILUENT

Alkylated phenol

The alkylated phenols useful in this invention are of the formula:

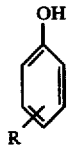

wherein R may be a straight chain or branched-chained alkyl group having from 8 to 35 carbon atoms and preferably from 10 to 30 carbon atoms. The R group or alkyl group may be present on any of the sites around the phenolic ring, i.e., ortho, meta or para. Preferably, the R groups will predominantly be meta or para: That is, less than 40 percent of the R groups will be in the ortho position and preferably less than 15 percent of the R groups will be in the ortho position. A particularly preferred alkylated phenol is polypropylene phenol, having from 9 to 20 carbon atoms in the polypropylene group.

Examples of suitable alkyls include, octyl, decyl, dodecyl, ethylhexyl, triacontyl, etc.; radicals derived from petroleum hydrocarbons such as white oil, wax, olefin polymers (e.g. polypropylene, polybutylene, etc.), etc. While one specific structure is indicated by the above formula, it should be recognized that mixtures of alkylated phenols can be successfully employed in the practice of this invention.

Alkaline earth metal base

Several of the alkaline earth metal hydroxides or oxides may be employed in this invention. Exemplary compounds include calcium hydroxide, calcium oxide, barium hydroxide, barium oxide, etc. Combinations of the oxides and hydroxides of different alkaline earth metals may also be successfully employed herein. When magnesium is the selected metal it is preferred to employ magnesium methoxide or magnesium methyl carbonate rather than the oxide or hydroxide form. The calcium and barium bases are preferred and calcium bases most preferred such as calcium oxide and calcium hydroxide.

Mutual solvent

The presence of a mutual solvent is critical in the practice of this invention. The solvent can comprise any stable organic liquid which has appreciable solubility for both the alkaline earth metal base and the alkyl phenol and sulfurized intermediate. Exemplary mutual solvents include ethylene glycol, 1,4-butane diol, derivatives of ethylene glycol, such as the monomethyl ether, monoethyl ether, etc. The vicinal glycols are preferred and ethylene glycol is most preferred since it serves to activate the neutralization reaction and to that extent typifies a catalyst, although the exact characteristics describing is function are unknown. A minimum of 0.1 mol of mutual solvent per mol of alkyl phenol originally charged is generally required in the first reaction step and a minimum of 0.5 mol of mutual solvent per mol of alkyl phenol originally charged is required in the second reaction step. Above a ratio 2:1 the necessary reactor volume is unduly increased and the reclamation of the solvent becomes a problem although a ratio as high as 4:1 is operable.

Reaction diluent

The reactoon diluent employed in the subject invention is preferably a mineral lubricating oil obtained from paraffinic, naphthenic, asphaltic or mixed base crudes and/or mixtures thereof having a flash point above about 350° F. The reaction diluent serves to reduce the viscosity of the sulfurized intermediate and the sulfurized metal phenate product to make them readily transferable by pumping operations and the like. Mineral lubricating oils are preferred since the ultimate use of the sulfurized metal phenates is in oil additives. However, any inert water-insoluble organic medium which would not react or interfere with the reaction of the process would be suitable. A particularly preferred reaction diluent is refined mid-continental neutral oil having a viscosity of about 100 SUS at 100° F.

PREPARATION OF LUBRICANT COMPOSITION

The lubricant composition of this invention can be prepared by simply mixing the sulfurized metal phenates produced in the above step within a suitable lubricating oil or lubricating oil compositions. The concentration of sulfurized metal phenate within the lubrication oil composition to realize the superior antioxidant and base reserve properties varies depending upon the type of sulfurized metal phenate selected, the particular properties desired and the type of lubricating oil selected. Generally, however, the concentration of the sulfurized metal phenate ranges from 0.5 to 15 weight percent and more preferably from 1 to 8 weight percent. Thus, the lubricating oil compositions generally have a sulfur content between about 0.03 and 3 weight percent and an alkaline earth metal content derived from the subject phenate between about 0.08 and 0.3 weight percent.

The lubricating oil which may be employed in the practice of this invention including a wide variety of natural and synthetic oils such as naphthenic base, paraffin base and mixed base lubricating oils. The oils generally have a viscosity of 35 to 50,000 SUS at 100° F. or from 30 to 150 SUS (Saybolt Universal Seconds) at a temperature of 210° F. Other hydrocarbon oils include oils derived from coal products and synthetic oils, e.g., alkylene polymers, (such as polymers of propylene, butylene, etc., and mixtures thereof), alkylene oxide type polymers (e.g., alkylene oxide polymers prepared by polymerizing alkylene oxide, e.g., propylene oxide polymers, etc., in the presence of water or alcohols, e.g., ethyl alcohol, carboxylic acid esters, (e.g., those which were prepared by esterifying such carboxylic acids as adipic acid, azelaic acid, suberic acid, sebacic acid, alkenyl succinic acid, fumaric acid, maleic acid, etc., with the alcohol such as butyl alcohol, hexyl alcohol, 2-ethylhexyl alcohol, pentaerythritol, etc.), liquid esters of phosphorus acids, alkyl benzenes, polyphenols (e.g., biphenyls and terphenyls), alkyl bisphenol ethers, polymers of silicon, e.g. tetraethyl silicate, tetraisopropyl silicate, hexyl(4-methyl-2-pentoxy)di-silicate, poly(methyl)siloxane, and poly(methylphenyl) siloxane, etc. The lubricating oils may be used individually or in combinations, whenever miscible or whenever made so by the use of mutual solvents.

In addition to the sulfurized metal phenates, other additives may be successfully employed within the lubricating composition of this invention without affecting its multi-functional properties. Exemplary additives include stabilizers, extreme pressure agents, tackiness agents, pour point depressants, lubricating agents, viscosity index improvers, color correctors, odor control agents, antiwear agents, antioxidants, metal deactivators, anticorrodants, etc.

The following examples are presented to illustrate the practice of specific embodiments of this invention and should not be interpreted as limitations upon the scope of the invention.

EXAMPLE 1

In this example a representative sulfurized metal phenate is prepared by the two step processing method of this invention. A 4000-gallon closed reaction vessel equipped with a stirrer, cooling coils, a thermometer, several inlet lines, a nitrogen gas inlet and a vacuum vent is charged with 18,020 pounds of tetrapropylene phenol, and 1,125 pounds of calcium oxide (98 percent purity). The contents are agitated and heated to 220° F. Thereafter 4,160 pounds of powdered sulfur are charged to the reactor and the mixture heated to 265–275° F. Ethylene glycol (880 pounds) is then charged to the reactor, and the cooling water is circulated through the cooling coils to maintain the reactor contents between 265 and 275° F. during the glycol addition. The temperature is then allowed to increase 5° F. and maintained at that temperature for about 1 hour. The contents are then heated to 355–360° F. and maintained at that temperature for an additional 4 hours. At the end of the four hour period, the reactor contents are cooled and charged with 500 gallons of diluent oil having a viscosity of about 100 SUS at 100° F. During the above reaction steps, the pressure on the system is maintained at substantially atmospheric with hydrogen sulfide and water vapor being removed overhead as they are evolved during the reaction.

When the reactor contents containing the diluent oil are cooled to 300–310° F., a vacuum of 10 inches of mercury is applied to the reaction vessel and maintained for 15 minutes. Thereafter 250 gallons of additional diluent oil are charged and admixed with the crude sulfurized intermediate within the reactor. The molar ratio of the various components present within the reactor is calculated to be 2 mols of sulfur, 0.3 mol of calcium oxide and 0.21 mol of ethylene glycol per mol of tetrapropenyl phenol charged to the reactor.

In the second processing step, 11,300 pounds of 68.5 weight percent of the crude sulfurized intermediate-in-oil solution prepared above are charged to a 4000-gallon closed reaction vessel equipped with cooling coils, thermometer, stirrer, a nitrogen gas inlet, several inlet lines and a vacuum vent. The contents are agitated and 2 pounds of DC-200 (silicone fluid) a foam inhibitor marketed by Dow Corning Company is admixed with the reactor contents along with 580 gallons of diluent oil.

Thereafter, 800 pounds of calcium hydroxide is charged to the reactor and the contents maintained at a temperature of 180–190° F. A vacuum of 10–12 inches of mercury is applied to the reactor as soon as the calcium hydroxide charge is completed. At the same time, 1,380 pounds of fresh ethylene glycol is quickly charged to the reactor. The temperature of the system is allowed to slowly increase to 300° F. over a 2½ hour period. When the contents reach 300° F., a 25-inch vacuum is applied and maintained for 30 minutes. The temperature is slowly increased to 390° F. under this vacuum to strip the ethylene glycol from the crude sulfurized calcium phenate. The stripping operation takes approximately 4 hours. The vacuum is broken and the contents cooled to 250° F. An additional 100 gallons of diluent oil (100 neutral) are added to the final product.

A representative sample of the product is recovered and the sulfurized metal phenate analyzed. The typical calcium content measured is found to be 4.5 weight percent (ASTM D811) and the typical sulfur content measured at 4.9 weight percent (ASTM D1552). The typical molar ratios of the various reactants in the final product are found to be as follows:

Molar ratios:
S/Ca 1.4
S/alkylphenol 0.9
Ca/alkylphenol 0.66

EXAMPLE 2

In this example a series of tests are performed with oils compounded with various sulfurized metal phenates having varying sulfur:calcium ratios and compared to the product prepared by the method of Example 1. The test is conducted in a glass cell consisting of a 100 ml. sample compartment, a stirring mechanism and a compartment holding solid sodium or potassium hydroxide pellets which serve as a drying agent as well as absorbent for volatile acidic oxidation products. The drying agent has only vapor phase contact with the liquid in the sample compartment. The cell is only open to a 1.5-liter bell jar filled with 99.85% oxygen kept at atmospheric pressure. In each set a 25-gram sample of compounded oil and 0.2 ml of catalyst solution are charged to the sample compartment of the cell. The oil within the cell is heated to a temperature of 340° F. and maintained at that temperature under vigorous agitation for 10 hours. The viscosity of the compounded oil is measured before its exposure to the oxygen source and after the 10-hour exposure period. The change in viscosity observed is indicative of the antioxidant properties of the sulfurized metal phenate present within the compounded oil with the greater the viscosity increase indicating a poorer antioxidant.

The compounded oils tested consist of a mid continent SAE 30 grade neutral refined oil containing 3.5 weight percent of a succinimide dispersant and 80 millimols of calcium in the form of one of the various sulfurized metal phenates described in Table 3 below.

The oxidation catalyst, a solution of metal naphthenates in kerosene, supplies 52 p.p.m. copper, 31 p.p.m. iron, 27 p.p.m. tin, 26 p.p.m. manganese and 603 p.p.m. lead in oil soluble form to the composition being tested.

The results of this test are reported in the following Table 3, below.

TABLE 3

| | Oxidator tests | | | |
|---|---|---|---|---|
| | Sulfurized metal phenate | | | |
| Compound | Sulfur (wt. percent) | Calcium (wt. percent) | S/Ca (wt. ratio) | Viscosity increase (percent) |
| A[1] | 2.1 | 3.1 | 0.69 | 128 |
| B[1] | 3.1 | 4.5 | 0.69 | 112 |
| C[2] | 3.7 | 9.3 | 0.4 | 110 |
| D[3] | 3.0 | 9.3 | 0.3 | 110 |
| E[4] | 4.9 | 4.5 | 1.1 | 26 |

[1]Prepared by reacting tetrapropylene phenol with calcium hydroxide and sulfur in the presence of ethylene glycol.
[2]Same as [1] except carbonated.
[3]Same as [1] except about 35 wt. percent of the alkyl phenol is derived from a straight chain α-olefin.
[4]Prepared from tetrapropylene phenol, calcium oxide, calcium hydroxide and sulfur by the method of Example 1.

The above table dramatically illustrates the improvements in antioxidant properties of the sulfurized metal phenates having a S/Ca ratio greater than 1 over the same type of sulfurized phenates having a ratio less than 1. As shown, compound E exhibits less than one-fourth the viscosity increase resulting from the other compounds.

EXAMPLE 3

The advantage of employing a two step process of this invention over a single step reaction scheme is illustrated by this example. A 3 liter reaction vessel equipped with a stirrer, thermometer, condenser and dropping funnel is charged with 661 grams of 100 neutral oil, 747 grams of tetrapropylenephenol, 197 grams of sulfur and 144 grams of calcium hydroxide. The mixture is heated to 260° F. under a vacuum of 10 mm. of Hg and vigorously agitated. Thereafter 346 grams of ethylene glycol are added to the mixture over a 20 minute period and the temperature allowed to increase to about 300° F. The temperature is maintained at 300° F. under a 10-inch Hg vacuum for a period of 2 hours. Thereafter, the temperature is increased to 386° F. over a 2½ hour period while simultaneously reducing the pressure to 11 mm. Hg. The contents are held at a temperature of 386° F. and pressure of 11 mm. Hg for 15 minutes and thereafter cooled and filtered.

A sample of the crude sulfurized metal phenate is filtered through diatomaceous earth and found to contain 5.54 weight per cent sulfur and 4.44 weight percent calcium to yield a S/Ca ratio of 1.56. The product had an alkalinity value of 114.3 mg. KOH/g. corresponding to a basic calcium content of 4.07%.

Another sample of the sulfurized metal phenate is subjected to the oxidator test as described in Example 2 along with a sample of the sulfurized metal phenate prepared by the method of Example 1. The results of these tests are reported in the following Table 4.

Table 4

| | Oxidator tests | |
|---|---|---|
| Composition | Preparation | Viscosity increase (percent) |
| Sulfurized calcium phenate | 1 step process | 20.4 |
| " | 2 step process | 16.1 |

The above table illustrates a 20 percent reduction in viscosity increase by utilizing the two step process method of this invention.

EXAMPLE 4

This example is presented to demonstrate the superiority of the sulfurized metal phenates of over another invention over sulfurized metal phenate having a sulfur:metal ratio below 1 and over a conventional sulfurized amino metal phenate. In this demonstration, six cylinder Caterpillar engines are employed and subjected to Caterpillar Tractor Company Test Procedure ET—40—1. In each test, a crankcase oil formulation, containing one of the sulfurized metal phenates, is prepared and employed in the Caterpillar engine. The engine is operated under severe conditions until ring sticking occurs at which time the engine is turned off, disassembled and inspected. The time required to cause the ring sticking to occur is recorded and is indicative of the dispersant and antioxidant properties of the sulfurized metal phenate employed.

The test engine is a six cylinder Caterpillar D-353 TA (turbocharged with an aftercooler) engine having a 6.25 inch bore, 8.0-inch stroke, 1473 cubic inch displacement and 490 brake horsepower at 1300 r.p.m. The operating conditions during the test is shown in the following Table 5.

Table 5

Engine operating conditions

Speed: 1300 r.p.m.
Fuel rate: 59,200 B.t.u.'s/min.
Sulfur content in fuel: 0.4 weight percent
Air inlet temperature: 235° F.
Water outlet temperature: 190° F.

The crankcase oil formulations consisted of RPM SAE 30 weight base of containing 2 weight percent of a conventional ashless dispersant, 20 millimols per kilogram of a conventional metallic dispersant and 90 millimols per kilogram of the sulfurized metal phenate based on the metal content. Test Oil A contains a sulfurized calcium phenate prepared by reacting calcium hydroxide with a tetrapropylene phenol and sulfur in the presence of ethylene glycol and has a sulfur to calcium weight ratio of about 0.4. Test Oil B contains a sulfurized calcium phenate prepared by the method of Example 1 and having a sulfur to calcium weight ratio of about 1.1. The results of the Caterpillar engine tests are reported in the following Table 6.

Table 6

| | Caterpillar engine tests | |
|---|---|---|
| Crankcase test oil | Sulfur: calcium ratio | Time to ring sticking (hours) |
| Test oil A | 0.4 | 36 |
| Test oil B | 1.1 | 175 |

The above table clearly illustrates the significant and unexpected increase in failure-free operating time of the high sulfur to metal ratio compounds of this invention compared to a conventional sulfurized metal phenate having sulfur to calcium ratio below 1.

The above examples illustrate only specific embodiments of the practice of this invention and should not be considered as limitations upon the scope of the claims.

We claim:

1. A composition of matter prepared by reacting an alkyl phenol having from 8 to 35 carbon atoms in the alkyl group, sulfur and an alkaline earth metal base in the presence of a mutual solvent to form a sulfurized metal phenate having a sulfur to metal atom ratio between 1 and 4 *and an alkalinity value of 40 to 200 mg. KOH/gram.*

2. The composition defined in claim 1 wherein said mutual solvent is ethylene glycol and said sulfur to metal atom ratio is between 1.1 and 2 and wherein said sulfurized metal phenate has an alkalinity value of 40 to 200 mg. KOH/gram.

3. The composition defined in claim 2 wherein said alkyl phenol is tetrapropylene phenol and said alkaline earth metal base is calcium oxide, hydroxide or combination thereof.

4. A composition of matter comprising a major portion of an oil of lubricating viscosity and from 0.5 to 15 weight percent of a composition as defined in claim 1.

5. The composition defined in claim 4 wherein said mutual solvent is ethylene glycol and said sulfur to metal atom ratio is between 1.1 and 2 and wherein said sulfurized metal phenate has an alkalinity value of 40 to 200 mg. KOH/gram.

6. The composition defined in claim 5 wherein said alkyl phenol is tetrapropylene phenol and said alkaline earth metal base is calcium oxide, hydroxide or combination thereof.

7. A process for producing a mixture of sulfurized metal phenates having a sulfur to metal atom ratio between 1 and 4 *and an alkalinity value of 40 to 200 mg. KOH/gram* which comprises:

a first contacting of 8.7 to 47 mol percent of an alkyl phenol having from 8 to 35 carbon atoms in the alkyl group, from 13 to 81 mol percent of sulfur, from 0.5 to 42 mol percent of an alkaline earth metal base and from 1.3 to 66 mol percent of a mutual solvent within a liquid reaction medium at a temperature of 250 to 450° F. and at a presence of 5 to 20 p.s.i.a. for a period of 1 to 6 hours, the mol ratio being maintained between 0.05 to 1.5 mols of metal base, 0.1 to 4 mols of mutual solvent and 1 to 5 mols of sulfur per mol of alkyl phenol; and a second contacting of the reaction product obtained from said first contacting with 0 to 49 mol percent of said alkaline earth metal base, and from 17 to 80 mol percent of said mutual solvent at a temperature of 250 to 450° F. and a pressure of 2 to 15 p.s.i.a. for a period of 4 to 10 hours.

8. The process defined in claim 7 wherein said mutual solvent is ethylene glycol and said alkaline earth metal base is calcium oxide or calcium hydroxide.

9. A process for producing a mixture of sulfurized metal phenates having a sulfur to metal atom ratio between 1 and 4 *and an alkalinity value of 40 to 200 mg. KOH/gram* which comprises:

contacting in a first step from 0.2 to 1 mol of an alkaline earth metal base, from 0.2 to 1 mol of a mutual solvent and from 1.5 to 3 mols of sulfur with each mol of an alkyl phenol having from 8 to 35 carbons; in the alkyl group said contacting being maintained at a temperature of 250 to 450° F. and a pressure of 5 to 20 p.s.i.a. for a period of 1 to 6 hours to produce a sulfurized intermediate reaction product; and contacting in a second step said sulfurized intermediate reaction product with 0.2 to 0.6 mol of an alkaline earth metal base and from 0.5 to 2 mols of mutual solvent per mol of said alkyl phenol in said first step;

said contacting in the second step being maintained at a temperature of 250 to 450° F. and a pressure of 2 to 15 p.s.i.a. for a period of 2 to 10 hours to produce a sulfurized metal phenate mixture.

10. The process defined in claim 9 wherein said mutual solvent is ethylene glycol, said alkaline earth metal base is calcium oxide or calcium hydroxide, and said mutual solvent is stripped from said sulfurized metal phenate mixture in said second step.

11. The process defined in claim 10 wherein an inert reaction diluent is present in said second step in an amount less than 50 weight percent.

12. The product produced by the method of claim 9.

13. The composition defined in claim 1 wherein said mutual solvent is 1,4-butanediol.

* * * * *